US011297338B2

(12) United States Patent
Helmrich et al.

(10) Patent No.: US 11,297,338 B2
(45) Date of Patent: Apr. 5, 2022

(54) SELECTIVE QUANTIZATION PARAMETER TRANSMISSION

(71) Applicant: Fraunhofer-Gesellschaft zur Förderung der angewandten Forschung e.V., Munich (DE)

(72) Inventors: Christian Helmrich, Berlin (DE); Heiko Schwarz, Berlin (DE); Detlev Marpe, Berlin (DE); Thomas Wiegand, Berlin (DE); Adam Wieckowski, Berlin (DE); Mischa Siekmann, Berlin (DE); Benjamin Bross, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/001,023

(22) Filed: Aug. 24, 2020

(65) Prior Publication Data
US 2020/0389657 A1 Dec. 10, 2020

Related U.S. Application Data

(63) Continuation of application No. PCT/EP2019/053967, filed on Feb. 18, 2019.

(30) Foreign Application Priority Data

Feb. 26, 2018 (EP) .................................... 18158707

(51) Int. Cl.
*H04N 19/31* (2014.01)
*H04N 19/172* (2014.01)
(Continued)

(52) U.S. Cl.
CPC ............ *H04N 19/31* (2014.11); *H04N 19/172* (2014.11); *H04N 19/186* (2014.11); *H04N 19/46* (2014.11); *H04N 19/91* (2014.11)

(58) Field of Classification Search
CPC .... H04N 19/31; H04N 19/172; H04N 19/186; H04N 19/46; H04N 19/91; H04N 19/124; H04N 19/70; H04N 19/44
(Continued)

(56) References Cited

U.S. PATENT DOCUMENTS

2005/0053150 A1* 3/2005 Hsu ..................... H04N 19/186
 375/240.18
2007/0116115 A1* 5/2007 Tong .................... H04N 19/177
 375/240.03
(Continued)

FOREIGN PATENT DOCUMENTS

CN 101438591 A 5/2009
CN 102572422 A 7/2012
(Continued)

OTHER PUBLICATIONS

V. Nascimento, J. Ascenso and F. Pereira, "H.264/AVC backward compatible bit-depth scalable video coding," 2014 IEEE 16th International Workshop on Multimedia Signal Processing (MMSP), 2014, pp. 1-6, doi: 10.1109/MMSP.2014.6958829. (Year: 2014).*
(Continued)

*Primary Examiner* — Marnie A Matt
(74) *Attorney, Agent, or Firm* — Novick, Kim & Lee, PLLC; Jae Youn Kim; Jihun Kim

(57) ABSTRACT

A video encoder encodes a video into a data stream, the video encoder being configured to vary a granularity at which a Quantization Parameter—QP—is applied depending on an association of frames of the video to temporally hierarchical layers at which the video is encoded into the
(Continued)

data stream. The technology also concerns a respective decoder, a respective method for encoding and decoding, and a computer program for implementing the methods.

24 Claims, 10 Drawing Sheets

(51) Int. Cl.
  *H04N 19/186* (2014.01)
  *H04N 19/46* (2014.01)
  *H04N 19/91* (2014.01)
(58) Field of Classification Search
  USPC .................................................. 375/240.26
  See application file for complete search history.

(56) References Cited

U.S. PATENT DOCUMENTS

| | | | |
|---|---|---|---|
| 2009/0067496 A1 | 3/2009 | Ying et al. | |
| 2012/0140825 A1* | 6/2012 | Huang | H04N 19/114 375/240.15 |
| 2013/0272390 A1* | 10/2013 | Joshi | H04N 19/176 375/240.03 |
| 2014/0233638 A1* | 8/2014 | Tu | H04N 19/176 375/240.03 |
| 2017/0094288 A1* | 3/2017 | Hannuksela | H04N 19/146 |

FOREIGN PATENT DOCUMENTS

| | | |
|---|---|---|
| CN | 104221378 A | 12/2014 |
| EP | 17192477 A | 9/2017 |
| JP | 2009-523339 A | 6/2009 |
| JP | 2017164268 A | 9/2017 |

OTHER PUBLICATIONS

Zakerinasab et al., "An Anatomy of SVC for Full HD Video Streaming," 2014 IEEE International Symposium on Modelling, Analysis & Simulation of Computer and Telecommunication Systems, 2014, pp. 345-354, doi: 10.1109/MASCOTS.2014.50 (Year: 2014).*
ITU-T, Recommendation H.265 and ISO/IEC, Int. Standard 23008-2, "High efficiency video coding," Geneva, Switzerland, Jan. 2017, online: http://www.itu.int/rec/T-REC-H.265.
V. Sze et al., High Efficiency Video Coding (HEVC)—Algorithms and Architectures, Cham, Switzerland: Springer International Publishing, 2014.
Wien M. et al, "SVC performance analysis", 21. JVT Meeting; 78. MPEG Meeting; Oct. 20, 2006-Oct. 27, 2006; Hangzhou,CN; (Joint Video Team of ISO/IEC JTC1/SC29/WG11 and ITU-T SG.16 ),, (Oct. 27, 2006), No. JVT-U141, XP030006787.
Bross B. et al, "High Efficiency Video Coding (HEVC) text specification draft 10 (for FDIS & Consent)", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, (Jan. 17, 2013), No. JCTVC-L1003, XP030113948.
Recommendation ITU-T H. 265, "Series H: Audiovisual and Multimedia Systems Infrastructure of audiovisual services—Coding of moving video", Apr. 2013, p. 34 and 50.
Daigoro Bando, "Office Action for JP Application No. 2020-544742", dated Dec. 7, 2021, JPO, Japan.
Rosewarne C et al., "High efficiency video coding (HEVC) test model 16 (HM 16) encoder description", Section 1.5.9, 24 JCT-VC meeting, 20161011.
Yilei Zhu, "Office Action for CN Application No. 201980027578.7", dated Jan. 11, 2022, CNIPA, China.

* cited by examiner

SELECTIVE QUANTIZATION PARAMETER TRANSMISSION

CROSS-REFERENCES TO RELATED APPLICATIONS

This application is a continuation of copending International Application No. PCT/EP2019/053967, filed Feb. 18, 2019, which is incorporated herein by reference in its entirety, and additionally claims priority from European Application No. EP 18 158 707.2, filed Feb. 26, 2018, which is incorporated herein by reference in its entirety.

The present invention is concerned with a coding concept for use in a still image codec and/or in a video codec such as, for example, a hybrid video codec.

BACKGROUND OF THE INVENTION

Contemporary perceptual image and video coders apply a quantization parameter—QP—for rate control which, in the encoder, is employed as a divisor to normalize the transform coefficients prior to their quantization and, in the decoder, to scale the quantized coefficient values for reconstruction.

In some codecs, for example in the so-called High Efficiency Video Coding—HEVC—as specified in [1], the QP value can be coded differentially, i.e. as a difference to the previously coded QP value, once per N×N block, with N=8, 16, 32, or 64, on a logarithmic scale with a step-size of nearly one dB:

$$\text{Encoder:} q = \text{round}(6 \log_2(QP) + 4), \text{Decoder:} QP' = 2^{(q-4)/6} \quad (1)$$

where q is the coded QP index and ' indicates the reconstruction. The differential q indices are typically entropy coded, e.g. by means of Huffman or arithmetic coding techniques. Notice that QP' is also utilized in the encoder-side normalization to avoid any error propagation effects due to the QP quantization. Perceptual QP adaptation methods adjust q locally based on the characteristics of the input image(s) in order to improve the perceptual reconstruction quality of said image(s) for a given bit-rate, i.e., bitstream size. An exemplary approach is provided in European Patent application 17192477 [2].

The above-mentioned coding concepts provide for a reduced bitstream size.

However, it would be favorable to provide a coding concept for still further reducing the bitstream size.

SUMMARY

An embodiment may have a video encoder for encoding a video into a data stream, wherein the video encoder is configured to vary a granularity at which a Quantization Parameter—QP—is applied depending on an association of frames of the video to temporally hierarchical layers at which the video is encoded into the data stream.

Another embodiment may have a video decoder for decoding a video from a data stream, wherein the video decoder is configured to vary a granularity at which a Quantization Parameter—QP—is applied depending on an association of frames of the video to temporally hierarchical layers.

Another embodiment may have a method for encoding a video into a data stream, the method having the steps of: applying a Quantization Parameter—QP—upon encoding the video, and varying a granularity at which the Quantization Parameter—QP—is applied depending on an association of frames of the video to temporally hierarchical layers at which the video is encoded into the data stream.

Another embodiment may have a method for decoding a video from a data stream, the method having the steps of: applying a Quantization Parameter—QP—upon decoding the video, and varying a granularity at which the Quantization Parameter—QP—is applied depending on an association of frames of the video to temporally hierarchical layers.

Another embodiment may have a non-transitory digital storage medium having a computer program stored thereon to perform the method for encoding a video into a data stream, the method having the steps of: applying a Quantization Parameter—QP—upon encoding the video, and varying a granularity at which the Quantization Parameter—QP—is applied depending on an association of frames of the video to temporally hierarchical layers at which the video is encoded into the data stream, when said computer program is run by a computer.

Another embodiment may have a non-transitory digital storage medium having a computer program stored thereon to perform the method for decoding a video from a data stream, the method having the steps of: applying a Quantization Parameter—QP—upon decoding the video, and varying a granularity at which the Quantization Parameter—QP—is applied depending on an association of frames of the video to temporally hierarchical layers, when said computer program is run by a computer.

A first aspect concerns a video encoder for encoding a video into a data stream, wherein the video encoder is configured to vary a granularity at which a Quantization Parameter—QP—is applied depending on an association of frames of the video to temporally hierarchical layers at which the video is encoded into the data stream.

A second aspect concerns a video decoder for decoding a video from a data stream, wherein the video decoder is configured to vary a granularity at which a Quantization Parameter—QP—is applied depending on an association of frames of the video to temporally hierarchical layers.

A third aspect concerns a method for encoding a video into a data stream, the method comprising applying a Quantization Parameter—QP—upon encoding the video, and varying a granularity at which the Quantization Parameter—QP—is applied depending on an association of frames of the video to temporally hierarchical layers at which the video is encoded into the data stream.

A fourth aspect concerns a method for decoding a video from a data stream, the method comprising applying a Quantization Parameter—QP—upon decoding the video, and varying a granularity at which the Quantization Parameter—QP—is applied depending on an association of frames of the video to temporally hierarchical layers.

According to a fifth aspect, computer programs are provided, wherein each of the computer programs is configured to implement the above-described method when being executed on a computer or signal processor, so that the above-described method is implemented by one of the computer programs.

The present invention is based on the finding that selectively transmitting and applying a quantization parameter—QP—to frames, or a spatial or chromatic subset of frames, may reduce the overall bitstream size by a small but considerable amount. Generally, a QP may be globally applied to each frame. Such a global QP may comprise a predetermined fixed value. A QP may also be locally applied as a local QP to a frame or to a spatial or chromatic subset of a frame. As far as the term subset is used herein, it includes a spatial and a chromatic subset. A spatial subset of a frame may be a slice or a block which may be used, for instance, in block-based transform codecs, whereas a chromatic subset of a frame may be a particular color channel, or color component, or color plane of said frame (as opposed to a luminance/luma channel or component or plane or another color channel or component or plane). Furthermore, a QP, and in particular a local QP, may be coded differentially as a difference to a previously coded QP. Such differentially coded QP may also be referred to as a Differential Quantization Parameter—DQP. With the present invention, the granularity at which a QP may be applied to frames or subsets of frames upon coding can be selectively varied for each frame, or even for each subset of a frame. Said varying granularity may define in which gradations the encoder may apply the QP to the frames, or subsets of frames, for example whether a local QP for local QP adaptation purposes, or whether only a global QP without a local QP may be applied upon coding. In the latter case, local QP adaptation may not be executed. In other words, a local QP information in the data stream may be used for a local QP adaptation of the respective frame or a spatial or chromatic subset (e.g. a slice or channel or plane) of said frame. As mentioned above, for example a DQP may be a local QP. According to the invention, the inventive encoder may selectively choose to not apply a QP adaptation, and in particular to not apply a local QP adaptation, to selected ones of the frames, or to at least a selected subset of said frames. Accordingly, no local QP information may be available in the data stream for those one or more selected frames for which no QP adaptation is intended. In other words, the inventive encoder may selectively disable adaptive QP-based coding, and in particular adaptive local QP-based coding, for selected ones of the frames of the video, or for at least a selected subset of said frames. Accordingly, the inventive encoder may be configured to not encode a QP information, and in particular a local QP information, into the data stream which may lead to a saving of the overall bitstream size. For example, the inventive encoder may encode a global QP information into the data stream, but it may selectively omit to encode a local QP information, for instance a DQP, into the data stream. In result, a local QP adaptation may be selectively omitted for selected ones of the frames or a spatial or chromatic subset of said frames. The inventive encoder may be configured to vary said granularity of applying a QP, e.g. a global QP and/or local QP, during coding. That is, the encoder may use a (local) QP-based coding scheme and may select individual frames, or a subset of said frames, for which the (local) QP-based coding scheme is selectively disabled. In result, the encoded data stream may comprise frames, or subsets of frames, that may have been encoded using a (local) QP-based coding scheme, e.g. a DQP-based coding scheme, and the data stream may at the same time also comprise frames, or subsets of frames, that may not have been encoded using a (local) QP-based coding scheme. Accordingly, the data stream may comprise a (local) QP information, e.g. DQP values, for some frames, or subsets of frames, and the data stream may comprise some other frames for which no (local) QP information is available. In known technology, only the mere capability of using a (local) QP-based coding scheme may be signaled at the start of a stream. Thus, in known technology (local) QP-based coding, e.g. DQP-based coding, may only be enabled or disabled for the entire stream before coding while the present invention may selectively and individually disable (local) QP-coding for single frames, or even for single spatial or chromatic subsets of frames, that are contained in the data stream. Moreover, the inventive encoder may do so during coding. The inventive encoder may be configured to select said individual or single frames based on an hierarchical order. For example, in temporally hierarchical image and video coding applications the input frames, or spatial or chromatic subsets of frames, may be associated to different temporally hierarchical layers. Said different temporally hierarchical layers may indicate a temporal order in which the frames, or spatial or chromatic subsets of frames, may be encoded. For example, frames, or subsets of frames, which are associated with a first temporally hierarchical layer may be encoded prior to frames, or subsets of frames, which are associated with a second temporal hierarchical layer. A typical example is a random-access-point (RAP) frame, also called Intra-only frame, which is (and may be) encodable and decodable without relying on any previously decoded frames. As such, it usually exhibits the lowest order of temporal hierarchy (usually zero). The inventive encoder may enable a (local) QP-based coding scheme for those frames, or subsets of frames, which are associated with the first temporally hierarchical layer, and it may disable the (local) QP-based coding scheme for those frames, or subsets of frames, which are associated with the second temporally hierarchical layer. Generally speaking, the second temporally hierarchical layer may have a higher order than the first temporally hierarchical layer, and thus, the frames being associated with the first temporally hierarchical order may be encoded and/or decoded prior to the frames being associated with the second temporally hierarchical layer. For example, the inventive encoder may apply a local QP, e.g. a DQP value, to those frames, or subsets of frames, which are associated with the lower, i.e. first, temporally hierarchical layer, and it may apply no local QP for those frames, or subsets of frames, which are associated with the higher, i.e. second, temporally hierarchical layer. In result, the inventive encoder may selectively vary a granularity at which a QP is applied depending on an association of frames, or subsets of frames, of the video to temporally hierarchical layers at which the video is encoded into the data stream.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
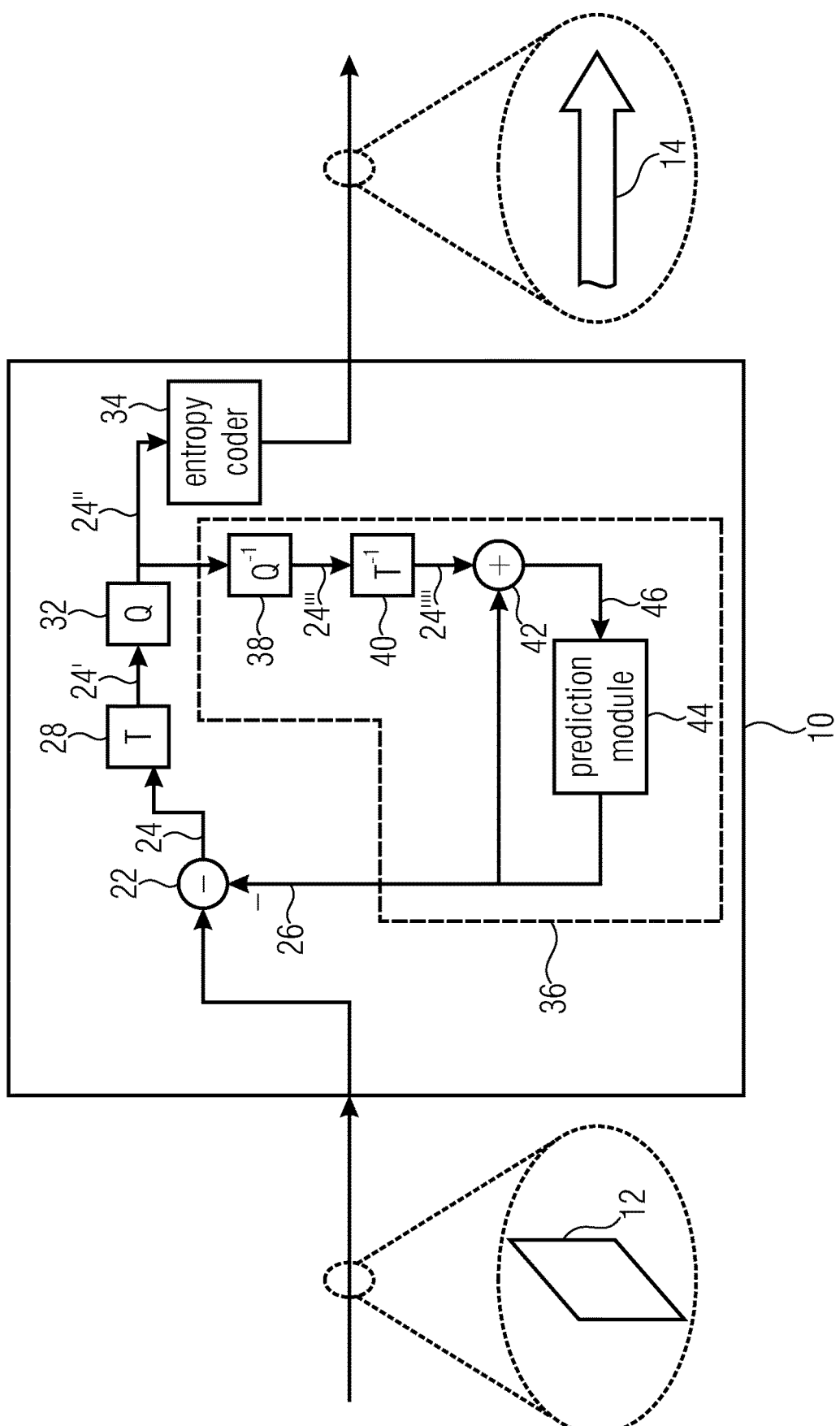
FIG. 1 shows a block diagram of an apparatus for predictively coding a picture as an example for an encoder where an intra prediction concept according to embodiments of the present application could be implemented.

Equal or equivalent elements or elements with equal or equivalent functionality are denoted in the following description by equal or equivalent reference numerals.

The following description of the figures starts with a presentation of a description of an encoder and a decoder of a block-based predictive codec for coding pictures of a video in order to form an example for a coding framework into which embodiments may be built in. The former encoder and decoder are described with respect to FIGS. 1 to 3. Thereinafter the description of embodiments of the concept of the present application is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
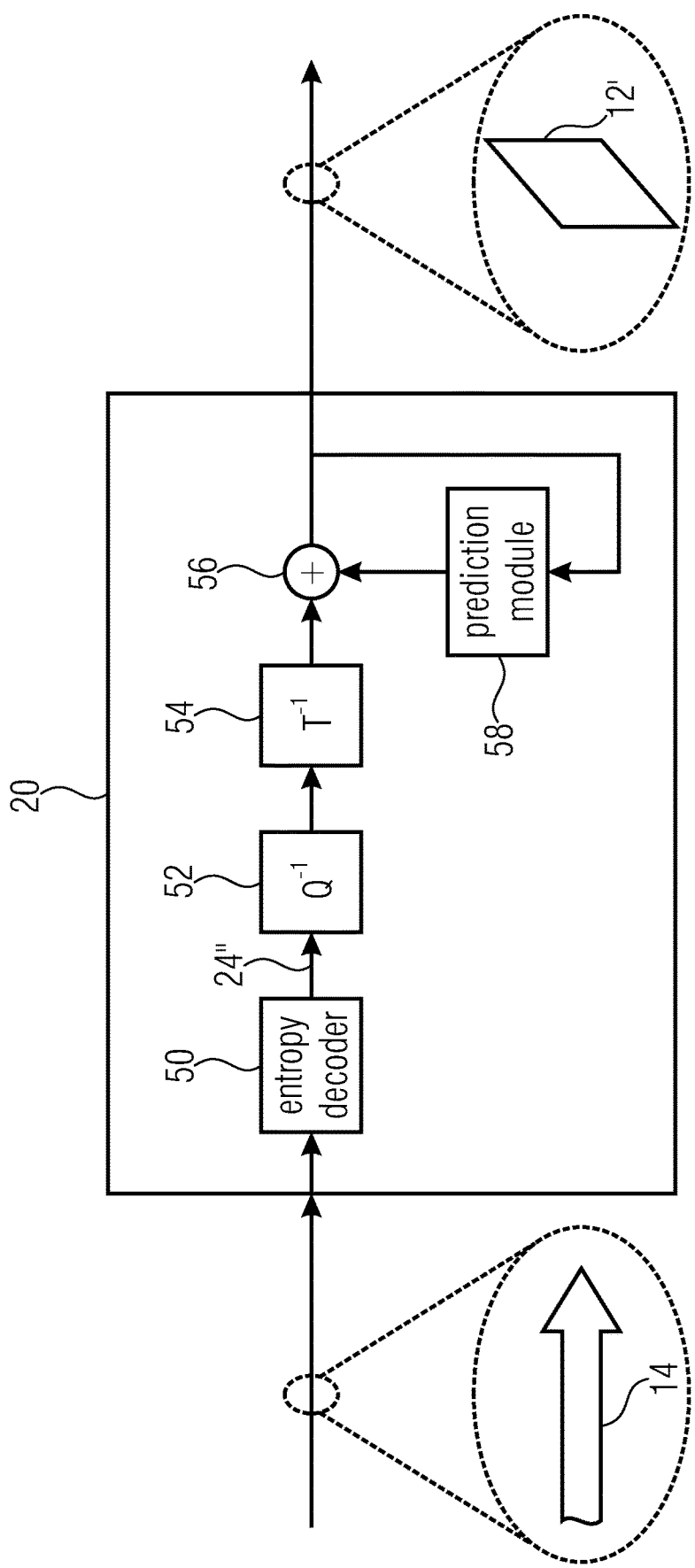
FIG. 2 shows a block diagram of an apparatus for predictively decoding a picture, which fits to the apparatus of FIG. 1, as an example for a decoder where an intra prediction concept according to embodiments of the present application could be implemented.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction, and/or chromatic prediction, i.e. cross-component prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being intercoded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, intercoded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
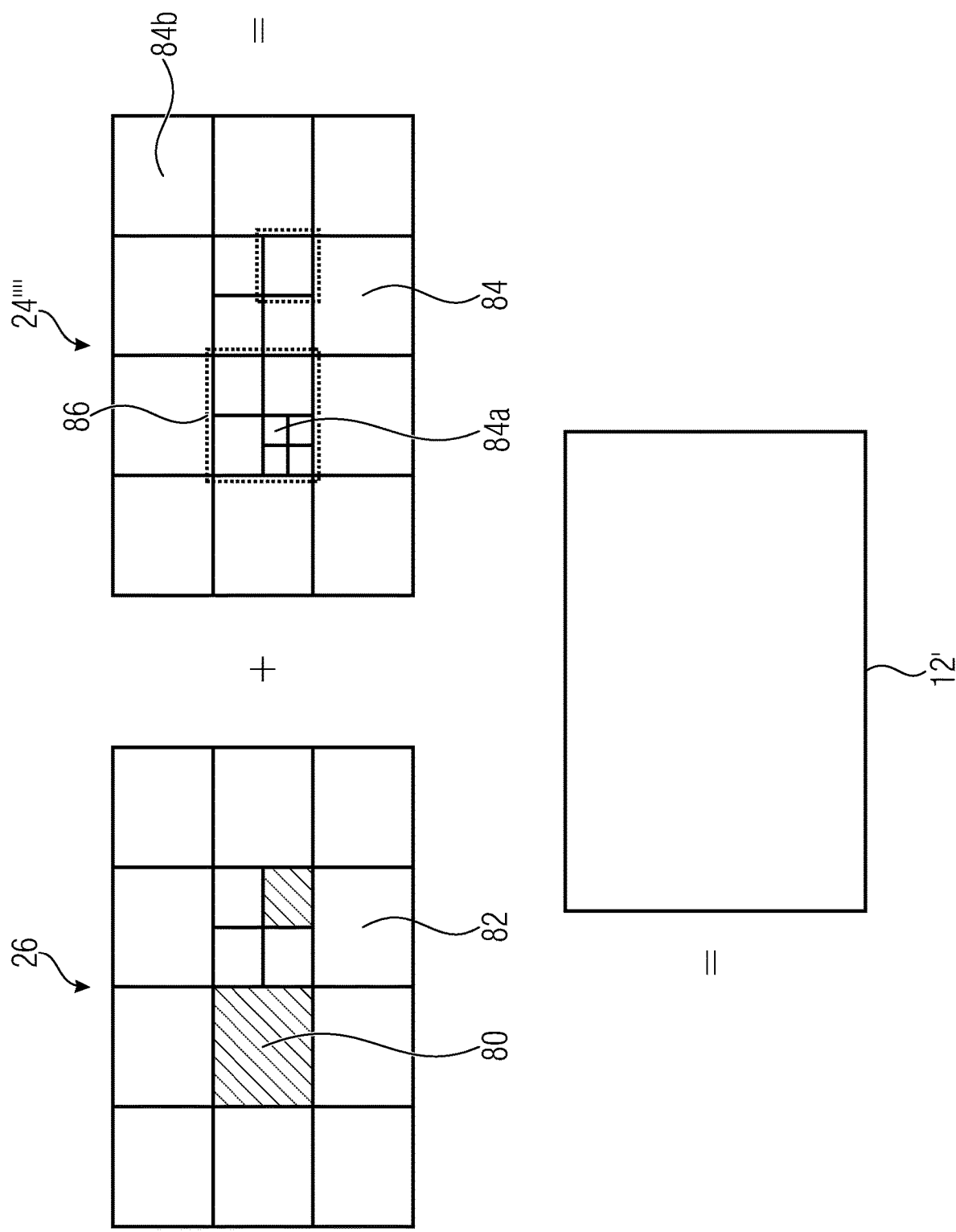
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of blocks or blocks, or a multi-tree subdivision of picture 12 into leaf blocks of varying size, such as a quadtree subdivision or the like, into blocks, wherein a mixture thereof is illustrated in FIG. 3 where the picture area is first subdivided into rows and columns of tree-root blocks which are then further subdivided in accordance with a recursive multi-tree subdivisioning. Again, data stream 14 may have an intra-coding mode coded thereinto for intra-coded blocks 80, which assigns one of several supported intra-coding modes to the respective intra-coded block 80. Further details are described below. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively. The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80/82 so that any border between two blocks of blocks 80 and 82 overlays a border between two blocks 84, or alternatively speaking each block 80/82 either coincides with one of the transform blocks 84 or coincides with a cluster of transform blocks 84. However, the subdivisions may also be determined or selected independent from each other so that transform blocks 84 could alternatively cross block borders between blocks 80/82. As far as the subdivision into transform blocks 84 is concerned, similar statements are thus true as those brought forward with respect to the subdivision into blocks 80/82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform segments 84 shall have the following significance. Transformer 28 and inverse transformer 54 perform their transformations in units of these transform segments 84. For instance, many codecs use some sort of DST or DCT for all transform blocks 84. Some codecs allow for skipping the transformation so that, for some of the transform segments 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the intraprediction concept described further below may be implemented in order to form specific examples for encoders and decoders according to the present application. Insofar, the encoder and decoder of FIGS. 1 and 2, respectively, represent possible implementations of the encoders and decoders described herein below. As will be outlined in more detail below, when having the subsequently explained embodiments for intra-prediction according to the present application built into the encoder and decoder of FIGS. 1 and 2, the encoder of FIG. 1 and the decoder of FIG. 2 support, at least as one option, to process an intra-predicted block 80 in the manner outlined in more detail below. Thus, the embodiments described hereinafter refer to an encoder which equals the encoder 10 of FIG. 1 which treats intra-coded blocks 80 in the manner outlined in more detail below and the same applies with respect to the decoder of FIG. 2 which, thus, represents an example for a decoder according to an embodiment where intra-coded blocks are treated in the manner outlined in more detail below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3, or even in that this encoder does not use transform prediction residual coding with coding the prediction residual, for instance, in spatial domain directly instead. Likewise, decoders according to embodiments of the present application may perform block-based decoding of picture 12' from data stream 14 using the intra-prediction coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Figure 4:
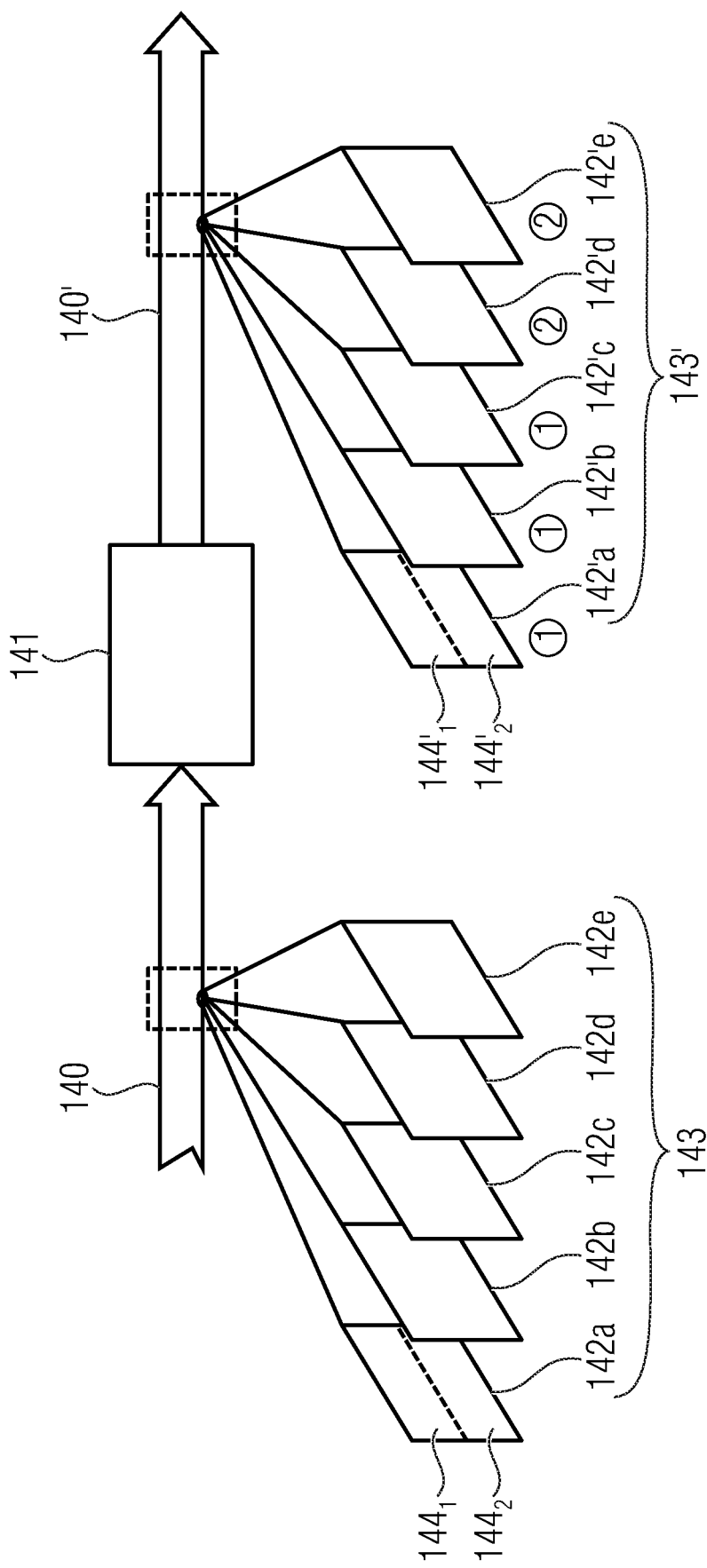
FIG. 4 shows a schematic block diagram of an encoder according to an embodiment.

FIG. 4 shows an embodiment of an encoder 141 according to the present disclosure. A group of pictures—GOP—143 may comprise one or more pictures 142a to 142e. Said pictures 142a to 142e may also be referred to as frames. A frame 142a to 142e may be subdivided into spatial subsets. For example, the frame 142a may be subdivided into one or more slices $144_1$, $144_2$. Alternatively or additionally, the frame 142a may also be subdivided into one or more chromatic channels or components or planes $144_1$, $144_2$, e.g. into one luminance (luma) and at least one chromatic (chroma) sub-frame in case of YCbCr (or YUV) coding or into three color sub-frames in case of RGB (red, green, blue) coding. Said one or more chromatic channels or components or planes $144_1$, $144_2$, may also be referred to as a subset of a frame 142a.

The GOP 143 may be fed as input into the encoder 141. The encoder 141 may encode the GOP 143 into the data stream 140' which is the output of the encoder 141. Thus, the encoded data stream 140' may comprise the encoded GOP 143'. The encoder 141 may use a coding scheme using Quantization Parameters—QP—which may also be referred to as a QP-based coding scheme.

Accordingly, the data stream 140' may comprise the encoded GOP 143', and the encoded GOP 143' may comprise the encoded frames 142'a to 142'e which have been encoded into the data stream 140' by using a particular coding scheme, in this example a QP-based coding scheme. Furthermore, the exemplary encoded frame 142'a may comprise encoded spatial or chromatic subsets/slices $144'_1$, $144'_2$ which may also have been encoded using a QP-based coding scheme.

The coding scheme may comprise a temporally hierarchical coding order comprising one or more temporally hierarchical layers. The encoded frames 142'a to 142'e may be associated with one of said temporally hierarchical layers. For example, the first three encoded frames 142'a, 142'b, 143'c may be associated with a first temporally hierarchical layer. Said first temporally hierarchical layer may comprise an index of one (i=1) which is symbolized by the encircled number one. The last two encoded frames 142'd, 142'e may be associated with a second temporally hierarchical layer. Said second temporally hierarchical layer may comprise an index of two (i=2) which is symbolized by the encircled number two.

The encoded frames 142'a, 142'b, 143'c being associated with the first temporally hierarchical layer may be encoded prior to the other frames 142'd, 142'e being associated with the second temporally hierarchical layer.

Furthermore, the encoded frames 142'a, 142'b, 143'c being associated with the first temporally hierarchical layer may be encoded using a local QP-based coding scheme, i.e. the encoder 141 may encode a local QP information for said encoded frames 142'a, 142'b, 143'c into the data stream 140'. Based on this local QP information, the encoded frames 142'a, 142'b, 143'c may be subjected to a local QP adaptation. A local QP adaptation may be executed on an entire frame or on a spatial or chromatic subset of a frame.

However, those encoded frames 142'd, 142'e being associated with the second temporally hierarchical layer may be encoded with a coding scheme different from a local QP-based coding scheme. Accordingly, the encoder 141 may omit encoding a local QP-information into the data stream 140'. Accordingly, the encoded frames 142'd, 142'e may not be subjected to a local QP adaptation.

As mentioned above, the encoded frames 142'd, 142'e being associated with the second temporally hierarchical layer may be encoded using a coding scheme different from a local QP-based coding scheme, such as for example a global QP-based encoding scheme in which a global QP, also referred to as an overall QP, is applied to each encoded frame 142'a to 142'e. For example, the encoded frames 142'a to 142'e may be encoded with a predetermined or fixed quantization using any other coding scheme different from a local QP-based coding scheme.

In other words, the inventive encoder 141 may be configured to selectively vary a granularity at which a QP is applied during coding, i.e. the encoder 141 may be configured to decide whether a QP-based coding scheme is applied globally on frame level or locally on frame level and/or spatial or chromatic subset level. Said granularity may be selected based on the respective temporally hierarchical layer with which a respective encoded frame 142'a to 142'e is associated.

The encoder 141 may be configured to select said granularity for each encoded frame 142'a to 142'e of an encoded GOP 143' individually and during coding.

In other words, the encoder 141 according to an embodiment may be configured to use a temporally hierarchical coding scheme, wherein at least one frame 142'a or a spatial or chromatic subset, e.g. a slice or channel or component or plane $144'_1$, $144'_2$ of said at least one frame 142'a, may be associated with a first temporally hierarchical layer (encircled number one) and wherein at least one further frame 142'd or a spatial or chromatic subset (not depicted) of said one further frame 142'*d* may be associated with a second temporally hierarchical layer (encircled number two).

A temporally hierarchical coding scheme may comprise a QP-based coding scheme, and a QP-based coding scheme may comprise a DQP-based coding scheme, as will be explained in the following.

The video encoder 141 may be configured to use predictive QP-coding, i.e. a QP value may be coded differentially as a difference to a previously coded QP value. Thus, only a residual, i.e. a Differential Quantization Parameter—DQP—may be applied during encoding and a corresponding DQP information may be encoded into the data stream 140'. This may also be referred to as a DQP-based coding scheme, wherein a DQP-based coding scheme may be an example of a local QP-based coding scheme.

In other words, a DQP may be a subset of a QP, and a QP-based coding scheme may comprise a DQP-based coding scheme. Thus, everything that is described herein with reference to QP-based coding may accordingly also be applied to DQP-based coding.

Thus, according to an embodiment, the video encoder 141 may be configured to use a DQP-based coding scheme, and the encoder 141 may be configured to selectively disable DQP coding for certain frames and to selectively omit encoding a DQP information into the data stream 140' for at least those frames 142'*d*, 142'*e*, or subsets of frames, which are associated with a predetermined temporally hierarchical layer, for example with the second temporally hierarchical layer (symbolized by encircled number two).

DQP coding may be applied locally, i.e. local DQPs may be used for differentially coding an entire frame based on a previously encoded frame, or for differentially coding a spatial or chromatic subset (e.g. a slice) of a frame based on a previously encoded spatial or chromatic subset (e.g. a slice) of a frame.

Figure 5A:
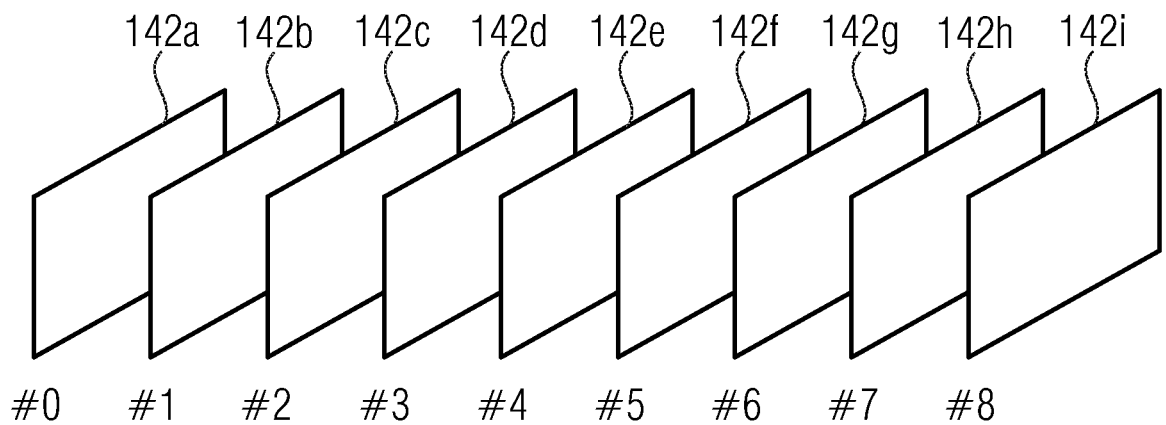
FIGS. 5A, 5B show an example of reordering frames in a temporally hierarchical coding scheme.
Figure 5B:
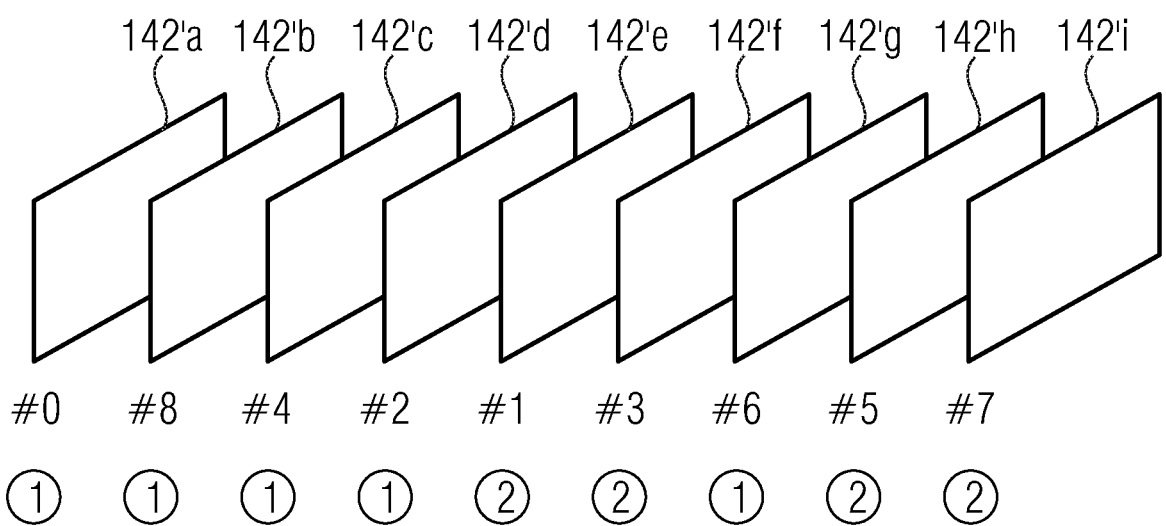

FIGS. 5A and 5B show an example of a temporally hierarchical coding scheme which may be used by the encoder 141 together with a QP-based coding scheme and/or a DQP-based coding scheme.

In conventional temporally hierarchical image and video coding applications, the input frames/slices may be reordered, and each frame/slice may be coded with a specific overall quantization setting based on the temporally hierarchical level to which it belongs [3].

FIGS. 5A and 5B show an example of a temporally hierarchical coding scheme that may be applied in the present invention, namely a random-access (RA) coding scheme. In this coding scheme the input image or video frames 142*a* to 142*i* with indices #0, #1, #2, #3, . . . , #7, #8 (FIG. 5A) may be reordered to #0, #8, #4, #2, #1, #3, #6, #5, #7 (FIG. 5B) and coded/decoded in that order, possibly using prediction from the previously coded frames if available.

In this specific example, the even-indexed frames 142'*a* (#0), 142'*i* (#8), 142'*e* (#4), 142'*c* (#2), 142'*g* (#6) may be associated with a first temporally hierarchical layer, which is symbolized by the encircled number one. The odd-indexed frames 142'*b* (#1), 142'*d* (#3), 142'*f* (#5), 142'*h* (#7) may be associated with a second temporally hierarchical layer, which is symbolized by the encircled number two. According to said temporally hierarchical order, the even-indexed frames which are associated with the first temporally hierarchical layer may be coded prior to the odd-indexed frames associated with the second temporally hierarchical layer. Furthermore, the even-indexed frames which are associated with the first temporally hierarchical layer may be coded using a local QP-based coding scheme, for example differentially coded using a DQP-based coding scheme.

Using an RA coding design, the odd-indexed frames 142'*b* (#1), 142'*d* (#3), 142'*f* (#5), 142'*h* (#7) associated with the higher or highest hierarchical level, may not be subjected to local QP adaptation since, due to an already efficient prediction from previously coded frames, such QP adaptation may result in only negligible improvement of the subjective reconstruction quality.

Thus, no differential QP (i.e. DQP) information may be included in the data stream 141' for said odd-indexed frames 142'*b* (#1), 142'*d* (#3), 142'*f* (#5), 142'*h* (#7).

It generally holds true for all embodiments as described herein that the temporally hierarchical order may comprise more than the exemplarily described two temporally hierarchical layers.

As a further more general example, the frames coded last, i.e. the frames which are associated with a highest temporally hierarchical layer, may not be subjected to local QP adaptation since, due to the efficient prediction from previously coded frames, such QP adaptation may result in only negligible improvement of the subjective reconstruction quality. Thus, no differential QP (DQP) information may be included in the data stream 141' for said frames being associated with the highest hierarchical layer.

This may in further examples also be valid for frames being associated with the highest and second highest temporally hierarchical layers, or even with frames being associated with the highest, the second highest and the third highest temporally hierarchical layers.

The inventive principle may, for instance, be used in codecs like HEVC (High Efficiency Video Coding).

However, in today's codecs like HEVC, only a general DQP coding capability is signaled at the start of a stream and cannot be disabled for specific frames during coding. The consequence is that, even for the above-mentioned odd-indexed frames where DQP coding is not needed and, thus, not used, some default DQP values of zero may be included in the bitstream which, unnecessarily, may consume a significant portion of the total bitstream size (since every second frame is actually affected).

The present invention avoids the unnecessary (since redundant) transmission of local QP data, e.g. of DQP data, in some specified frames (or, alternatively, slices which are spatial or chromatic subsets of a frame) of a compressed image or video bitstream. Thereby, the overall bitstream size can be reduced by a small but considerable portion.

More specifically, the invention avoids the need to encode into and decode from the bitstream 140' any DQP values in temporally hierarchical image and video coding applications if the index of the hierarchical layer to which a given frame 142'*a* to 142'*i* or slice or channel or component or plane 144'$_1$, 144'$_2$ belongs (i.e. is associated with) lies above a predefined threshold. In the above example of random-access (RA) coding configurations, all frames with an odd picture order count (POC), which may be associated with the highest-indexed hierarchical layer (e.g. encircled number two), are assumed to have only DQPs of value zero '0' which, according to the invention, may not need to be transmitted in the bitstream 140'.

Accordingly, the inventive principle may also be referred to as a selective local QP transmission, or selective DQP transmission.

In other words, the inventive encoder 141 may selectively enable a QP-based (or DQP-based) coding, and in particular a local QP-based (or DQP-based) coding, for selected ones of the frames of the video, or for at least a selected subset of said frames, wherein a QP information (or DQP information), and in particular a local QP information, is encoded into the bitstream 140' only for those selected frames or subsets of frames. Said selection is based on an association of the frames to temporally hierarchical orders.

Stated the other way around, the inventive encoder 141 may selectively disable a QP-based (or DQP-based) coding, and in particular a local QP-based (or DQP-based) coding, for selected ones of the frames of the video, or for at least a selected subset of said frames, wherein the encoder 141 omits to encode a QP information (or DQP information), in particular a local QP information, into the bitstream for those selected frames or subsets of frames. Said selection is based on an association of the frames to temporally hierarchical orders.

Figure 6:
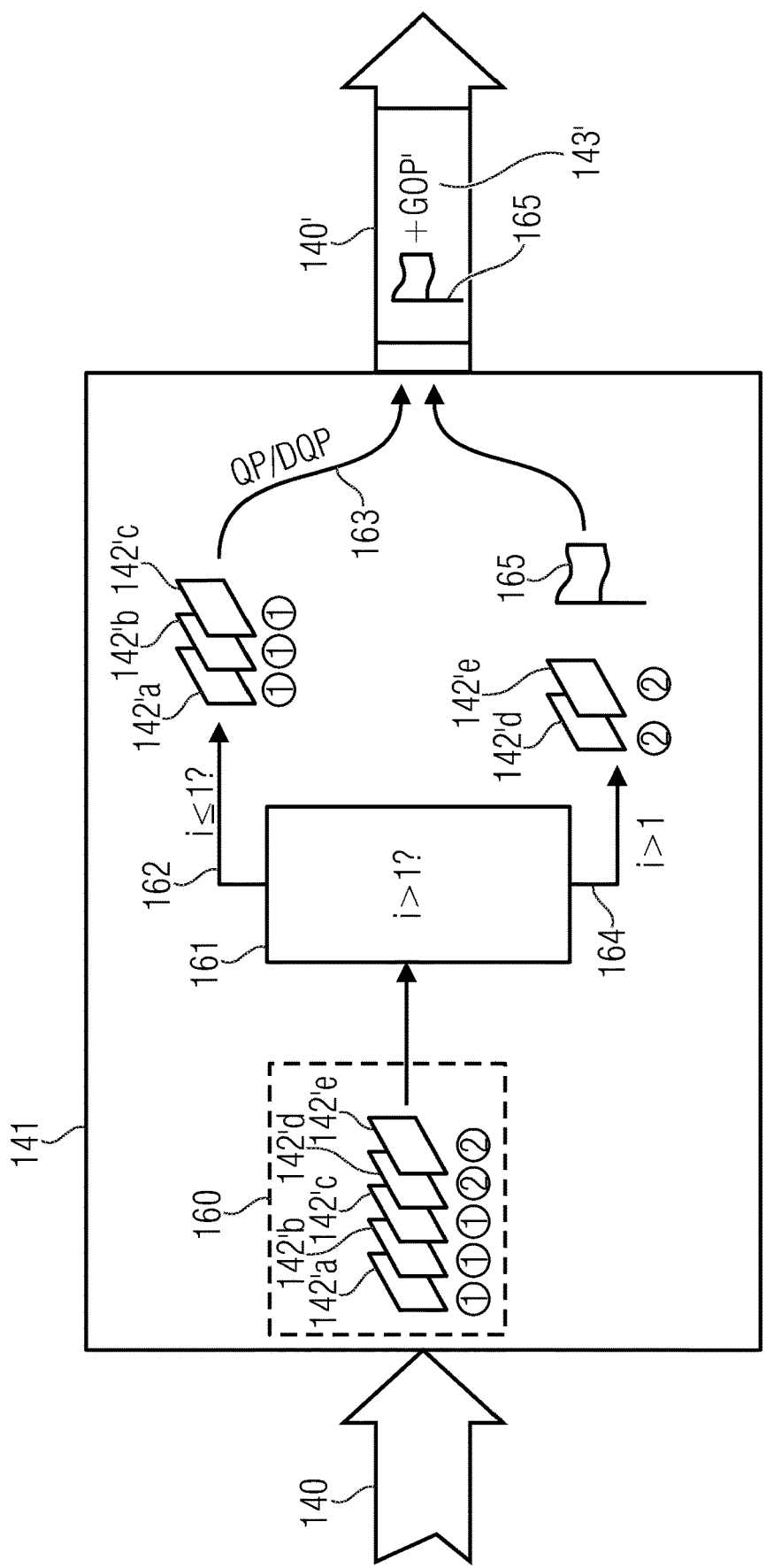
FIG. 6 shows a schematic block diagram of an encoder according to an embodiment.

FIG. 6 shows a more detailed view of an example of an inventive encoder 141 for exploiting the above described inventive principle. For avoiding unnecessary repetition, this example may refer to the example frames 142'*a* to 142'*e* and spatial or chromatic subsets 144'$_1$, 144'$_2$ as previously discussed with reference to FIG. 4.

As can be seen in FIG. 6, the frames 142'*a* to 142'*e* may be associated with different temporally hierarchical layers. The frames 142'*a*, 142'*b*, 142'*c* may be associated with a first temporally hierarchical layer, which is again symbolized by encircled index number one. The other frames 142'*d*, 142'*e* may be associated with a second temporally hierarchical layer, which is symbolized by encircled index number two.

The temporally hierarchical layers with index one and index two may only be described herein as non-limiting examples. The inventive principle may also be used with frames being associated with more than two different temporally hierarchical layers.

Independent from the number of temporally hierarchical layers, the encoder 141 may be configured to determine an index of a temporally hierarchical layer with which a frame or a spatial or chromatic subset of the frame is associated. That is, the encoder 141 may comprise an index determination stage 160 for determining an index of temporally hierarchical layers with which the frames 142'*a* to 142'*e* may be associated.

The frames 142'*a* to 142'*e* may also be reordered during coding, as previously described with reference to FIGS. 5A and 5B.

The encoder 141 may also be configured to compare the determined index of the frames 142'*a* to 142'*e* with a predetermined index threshold value. For this, the encoder 141 may comprise a comparator stage 161. In this example, the index threshold value may be exemplarily set to the value one. However, the index threshold value may be any other number than one.

In transition 162 the result of the comparison is negative, i.e. the index of those frames may not exceed the index threshold value (one). This may be the case for the frames with index one, i.e. for frames 142'*a*, 142'*b*, 142'*c*.

Thus, as depicted with transition 163, the encoder may use a local QP-based or DQP-based coding scheme for encoding said frames 142'*a*, 142'*b*, 142'*c*, and a respective local QP or DQP information may be encoded into the data stream 140'. Accordingly, these frames 142'*a*, 142'*b*, 142'*c* may be candidates for being subjected to local QP adaptation, as described above.

In other words, if the index of the hierarchical layer with which a frame 142'*a* to 142'*e* may be associated is equal to or lower than the index threshold value (one), the encoder 141 may be configured to enable the DQP coding scheme and to encode a DQP information into the data stream 140' for those frames 142'*a*, 142'*b*, 142'*c* being associated with the temporally hierarchical layer having an index being equal to or lower than the index threshold value.

In transition 164 the result of the threshold comparison is positive, i.e. the index of those frames may exceed the index threshold value (one). This may be the case for the frames with index two, i.e. for frames 142'*d*, 142'*e*.

The encoder 141 may disable local QP-based or DQP-based coding for these frames 142'*d*, 142'*e*. That is, the encoder 141 may omit encoding a local QP or DQP information into the data stream 140'. The encoder 141 may signal said disabling of local QP-based or DQP-based coding by setting a flag 165. Accordingly, the encoder 141 may use a coding scheme different from a local QP-based or DQP-based coding scheme for encoding the selected frames 142'*d*, 142'*e* into the data stream 140'. Furthermore, the encoder 141 may set the flag 165 in the data stream 140'.

In other words, if the index of the temporally hierarchical layer with which a frame 142'*a* to 142'*e* may be associated is larger than the index threshold value (one), the encoder 141 is configured to disable a local QP-based or DQP-based coding and to omit encoding a local QP or DQP information into the data stream 140', and to set a flag 165 in the data stream 140' indicating that the data stream 140' does not contain a local QP or DQP information for those frames 142'*d*, 142'*e* being associated with the temporally hierarchical layer having an index above the index threshold value.

Accordingly, the data stream 140' may comprise the flag 165, and the data stream 140' may comprise the encoded GOP 143' comprising both frame-types, i.e. frames 142'*a*, 142'*b*, 142'*c* for which a local QP or DQP information has been additionally encoded into the data stream 140' and frames 142'*d*, 142'*e* for which no local QP or DQP information has been encoded into the data stream 140'.

The flag 165 may be entropy-encoded into the data stream 141 and transmitted at the start of the data stream 141. Alternatively, for example if an RA coding scheme is used, as explained above, the flag 165 may be transmitted at the start of a random access point of the data stream 140'.

For example, at the encoder 141, a 1-bit flag useSelectiveDQP may be entropy-encoded and transmitted at the start of the bitstream 140' (or, alternatively, at the start of each random access point of the stream, if a RA coding scheme is used). This 1-bit flag may be used to indicate whether the inventive principle (i.e. omit encoding a local QP or DQP information) shall be applied (value 1) or not (value 0).

During encoding, in frames 142'*d*, 142'*e* (or, alternatively, slices) where DQP coding is not used (as indicated by the frame/slice index), no DQP values may be encoded and consequently, no DQP data may be transmitted in the bitstream 140', and subsequent algorithmic operations may assume each DQP value to be zero (i.e., each actual QP value may equal its associated predicted QP value).

Known technology transmits a sliceQP value for each frame/slice regardless of whether DQP coding is actually allowed. Thus, when DQP coding is allowed, the predicted QP value associated with the first QP value of a frame/slice is based on said sliceQP value in order to improve this first prediction (instead of simply assuming a first predicted QP value of, say, 0). When DQP coding is not allowed, no local (D)QP information is available, and said sliceQP is used as local QP throughout the entire frame/slice.

Summarizing in more general terms, the encoder 141 may use a first granularity of applying a QP to frames 142'*a*, 142'*b*, 142'*c* being associated with a first temporally hierarchical layer, and the encoder 141 may use a second granularity of applying a QP to frames 142'd, 142'e being associated with a second temporally hierarchical layer. Accordingly, the encoder 241 may vary the granularity at which a QP may be applied to certain frames (or subsets of frames). For example, for the frames 142'a, 142'b, 142'c being associated with the first temporally hierarchical layer, a local QP information may be available in the data stream 140'. Thus, these frames 142'a, 142'b, 142'c may be candidates for being subjected to a local QP adaptation during coding. For the frames 142'd, 142'e being associated with a second temporally hierarchical layer, no local QP information may be available in the data stream 140'. For example, only a global or fixed QP information may be available. Thus, these frames 142'd, 142'e may not be subjected to a local QP adaptation during coding.

Figure 7:
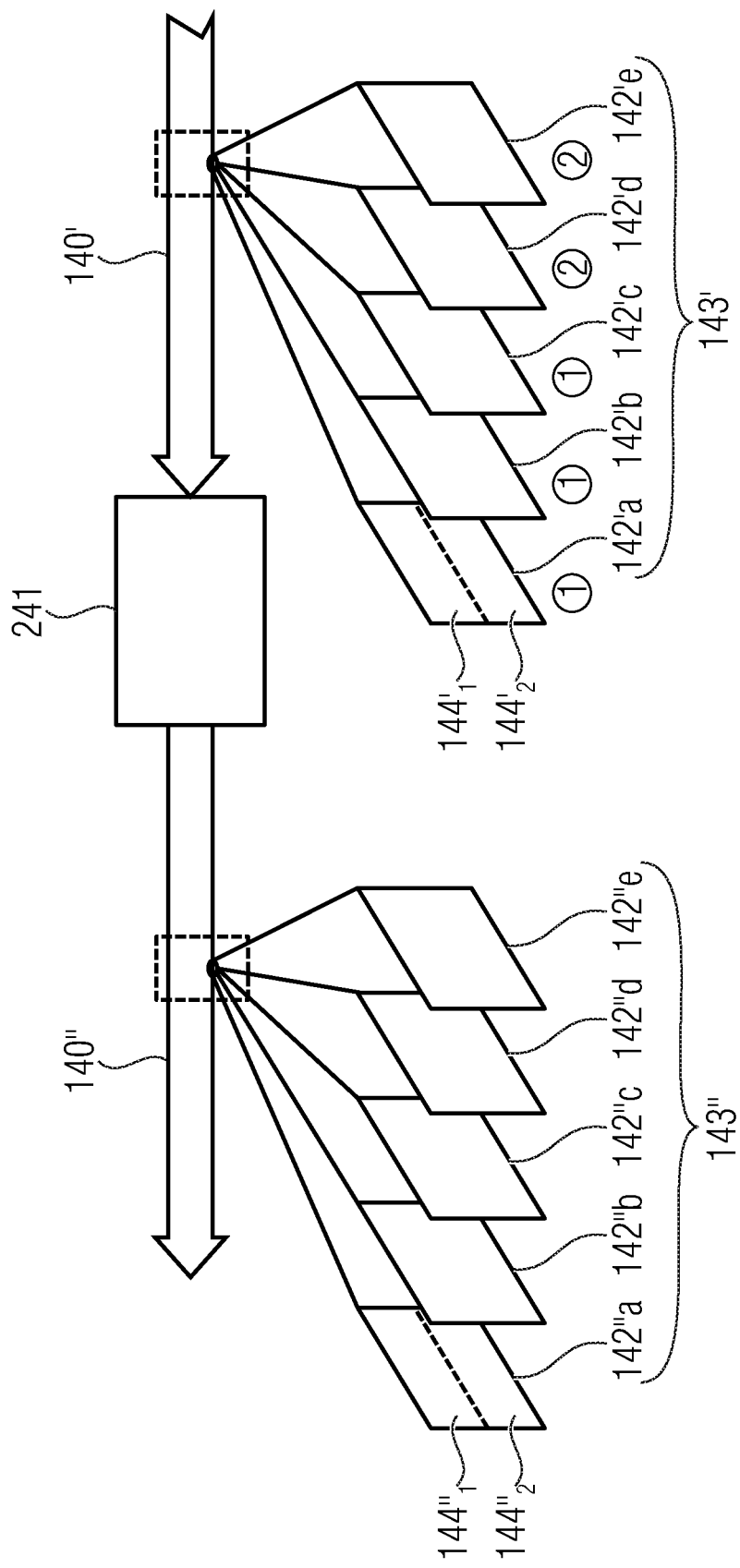
FIG. 7 shows a schematic block diagram of a decoder according to an embodiment.

FIG. 7 shows an inventive decoder 241 according to an embodiment. The decoder 241 may receive the encoded data stream 140' which has been described above with reference to the encoder 141. The encoded data stream 140' may comprise the encoded GOP 143', wherein the encoded GOP 143' may comprise the encoded frames 142'a to 142'e, wherein some of the encoded frames 142'a may be subdivided into one or more spatial or chromatic subsets 144'$_1$, 144'$_2$, such as blocks or slices.

Furthermore, the encoded frames 142'a to 142'e may comprise an index representing a temporally hierarchical layer. In other words, the encoded frames 142'a to 142'e may be associated with a temporally hierarchical layer, as described above with respect to the encoder 141.

The index of the hierarchical layers may indicate towards the decoder 241 whether to apply a local QP-based or DQP-based coding scheme when decoding the encoded frames 142'a to 142'e. A local QP-based or DQP-based coding scheme may provide for a local QP adaptation. To take up the example above, those encoded frames 142'a, 142'b, 142'c that may be associated with a first hierarchical layer (encircled number one) may be decoded using a local QP-based or DQP-based coding scheme. Those encoded frames 142'd, 142'e that may be associated with a second hierarchical layer (encircled number two) may be decoded with a coding scheme other than a local QP-based or DQP-based coding scheme, e.g. with a global QP-based coding scheme which may not allow for a local QP adaptation.

Thus, the index of the temporally hierarchical layers of the frames 142'a to 142'e may indicate towards the decoder 241 whether to apply a local QP-based or DQP-based coding scheme or to apply a coding scheme other than a local QP-based or DQP-based coding scheme, such as, for instance, a fixed or global QP-based coding scheme.

In other words, the inventive decoder 241 may be configured to vary a granularity at which a QP may be applied during decoding the frames 142'a to 142'e or spatial or chromatic subsets of the frames, wherein varying the granularity may depend on an association of the frames 142'a to 142'e of the video to temporally hierarchical layers.

The decoder 241 may decode the encoded frames 142'a to 142'e using a coding scheme as described above and it may create a reconstructed GOP 143" comprising reconstructed frames 142"a to 142"e, wherein some reconstructed frames 142"a may comprise reconstructed spatial or chromatic subsets 144"$_1$, 144"$_2$, such as blocks or slices.

Accordingly, the decoder 241 may decode an output video stream 140" comprising the decoded and reconstructed frames 142"a to 142"e of the encoded video, wherein the reconstructed frames 142"a to 142"e may be identical to the original frames 142a to 142e (FIG. 4) except for quantization losses.

The decoder 241 may be configured to use a temporally hierarchical coding scheme, wherein at least one received encoded frame 142'a or a spatial or chromatic subset 144'$_1$, 144'$_2$ of said at least one frame 142'a may be associated with a first temporally hierarchical layer (encircled number one) and wherein at least one received encoded further frame 142'd or a spatial or chromatic subset of said one further frame may be associated with a second temporally hierarchical layer (encircled number two).

The received frames 142'a to 142'e may be reordered as described above with reference to FIGS. 5A and 5B. The decoder 241 may be configured to reorder the frames 142'a to 142'e into the original order during decoding. In result, the decoded and reconstructed frames 142"a to 142"e may comprise the same order as the original frames 142a to 142e.

For those frames 142'd, 142'e being associated with the second temporal hierarchical layer, the decoder 241 may omit decoding a local QP information or DQP information from the data stream 140' since, for those frames, the encoder 141 may not have encoded any local QP information or DQP information into the data stream 140'. The decoder 241 may decide whether to decode or not to decode a local QP information or DQP information during decoding.

Generally speaking, the video decoder 241 of this embodiment may be configured to omit decoding a local QP information or DQP information from the data stream 140' for one or more frames 142'd, 142'e or spatial or chromatic subsets of said frames, which are associated with a predetermined temporally hierarchical layer, during decoding.

Thus, in some embodiments, the decoder 241 may be configured to decode the QP differentially. For example, the decoder 241 may be configured to use a Differential Quantization Parameter—DQP—based coding scheme, wherein the decoder 241 may be configured to selectively disable the DQP-based coding and omit decoding a DQP information from the data stream 140' for one or more frames 142'd, 142'e or a spatial or chromatic subset of said one or more frames 142'd, 142'e, if said frames 142'd, 142'e or said spatial or chromatic subsets of said frames 142'd, 142'e are associated with a predetermined temporally hierarchical layer.

Said DQP-based coding may be a local DQP-based coding for decoding a local DQP information from the data stream 140'. With said local DQP information, the respective frame or spatial or chromatic subset of the frame may be subjected to a local QP adaptation. However, if the decoder 241 may omit decoding such a DQP information from the data stream 140' for one or more frames 142'd, 142'e, as mentioned above, said frames 142'd, 142'e may not be subjected to a local QP adaptation.

Thus, in some embodiments, the decoder 241 may be configured to disable the DQP-based coding and omit decoding a DQP information from the data stream 140' for one or more frames 142'a to 142'e or a spatial or chromatic subset of said one or more frames, which are associated with a highest temporally hierarchical layer. As mentioned above, the temporally hierarchical order may comprise more than two temporally hierarchical layers, which are only mentioned herein as non-limiting examples.

According to yet a further embodiment, the decoder 241 may be configured to disable the DQP-based coding and omit decoding a DQP information from the data stream 140' for one or more frames 142'a to 142'e or a spatial or chromatic subset of said one or more frames, which comprise an odd picture order count—POC—and which are associated with a predetermined temporally hierarchical layer, for instance with the second temporally hierarchical layer as exemplarily described herein. For details regarding the POC, it is referred to FIGS. 5A and 5B and the corresponding description above.

Figure 8:
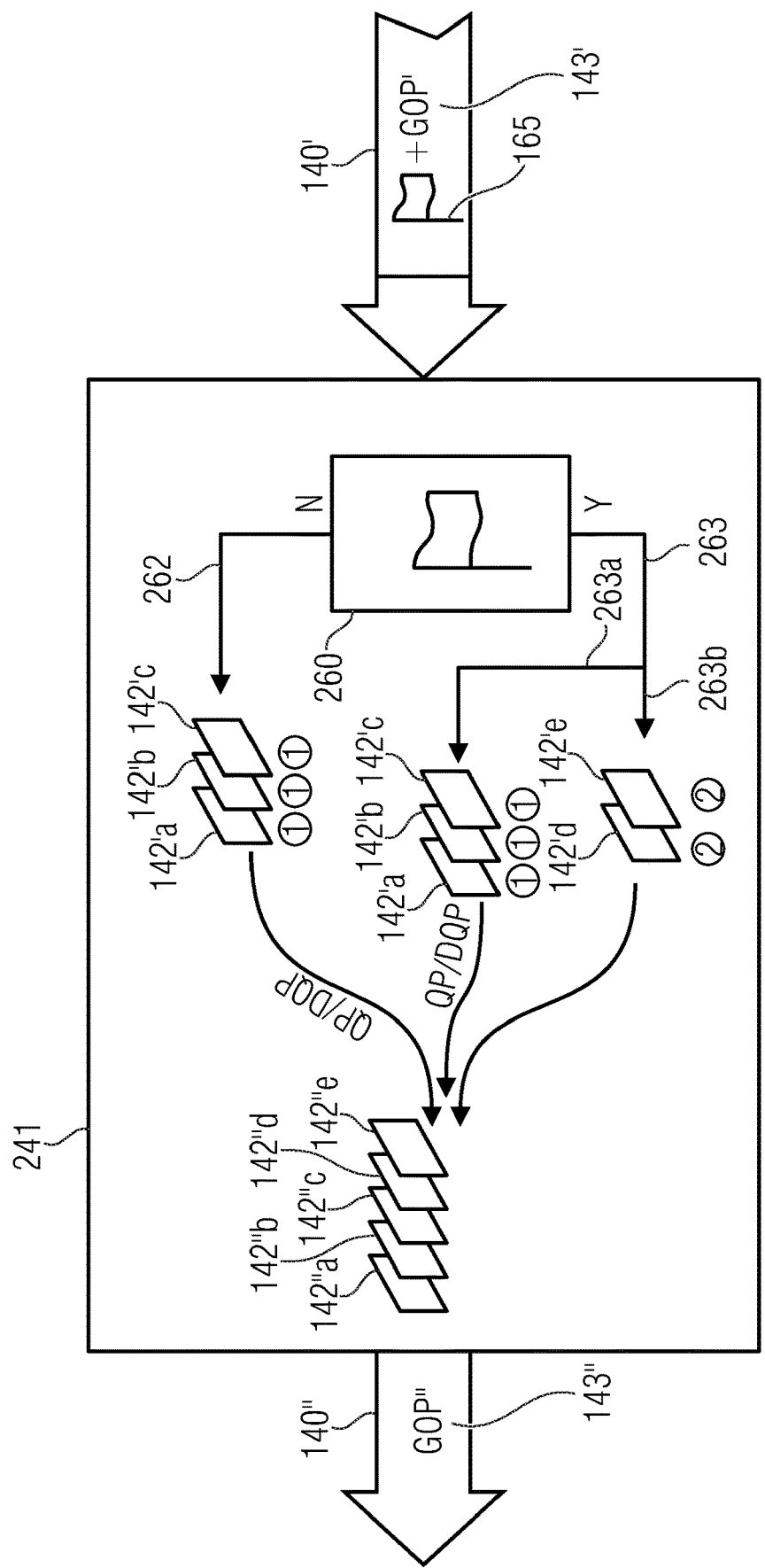
FIG. 8 shows a schematic block diagram of a decoder according to an embodiment.

FIG. 8 shows an example how the decoder 241 may internally decode the encoded data stream 140' so as to reconstruct the encoded frames and to provide the decoded and reconstructed video stream 140".

As can be seen, the decoder 241 may receive the encoded data stream 140' which may comprise the encoded GOP 143' comprising the encoded frames 142'a to 142'e. As explained above with respect to the encoder 141, the encoded data stream 140' may also comprise a flag 165 indicating which coding scheme was applied upon encoding the frames 142'a to 142'e, e.g. whether one or more frames 142'd, 142'e may be contained in the data stream 140' for which no local QP information or DQP information may have been encoded into the data stream 140'.

Accordingly, the decoder 241 may comprise a determination stage 261 configured for determining whether said flag 165 is set or not. If the flag 165 is not set, as indicated by transition 262, then the decoder 241 may apply a local QP or DQP during decoding. That is, the decoder 241 may use a local QP-based or a DQP-based coding scheme for decoding the frames 142'a, 142'b, 142'c (or subsets of frames) being associated with the first temporally hierarchical layer. For these frames 142'a, 142'b, 142'c a local QP information or DQP information may be contained in the data stream 140'. Accordingly, the decoder 241 may decode said QP information or DQP information for said frames 142'a, 142'b, 142'c from the data stream 140', and the decoder 241 may decode said frames 142'a, 142'b, 142'c using the corresponding QP or DQP information. During coding, said frames 142'a, 142'b, 142'c may be subjected to a local QP adaptation.

If the determination stage 261 may determine that the flag 165 is set, as indicated by transition 263, then the decoder 241 may be informed that the encoded GOP 143' may comprise one or more frames 142'd, 142'e (or subsets of frames) which are associated with a predetermined temporally hierarchical layer (e.g. the second layer), wherein the data stream 140' may not comprise a local QP information or DQP information for these frames 142'd, 142'e.

However, the data stream 140' may additionally also comprise one or more frames 142'a, 142'b, 142'c for which a QP information or DQP information is encoded in the data stream 140'.

Thus, the transition 263 splits into a first branch 263a and a second branch 263b. In the first branch 263a, the decoder 241 may decode the frames 142'a, 142'b, 142'c being associated with the first temporally hierarchical layer in a manner as described above. That is, the decoder 241 may decode the local QP information or DQP information from the data stream 140' such that the corresponding frames 142'a, 142'b, 142'c may be subjected to a local QP adaptation.

In the second branch 263b the decoder 241 may decode those frames 142'd, 142'e which are associated with the predetermined temporally hierarchical layer (e.g. second layer) and for which no local QP information or DQP information may be available in the data stream 140'. Accordingly, in the second branch 263b the decoder 241 may disable local QP-based or DQP-based decoding and it may omit decoding a local QP information or DQP information from the data stream 140' for these frames 142'd, 142'e. Thus, these frames 142'd, 142'e may not be subjected to a local QP adaptation.

In other words, the decoder 241 may be configured to derive a flag 165 from the data stream 140', wherein the flag 165 indicates how to decode a frame 142'a to 142'e or a spatial or chromatic subset of said frame based on an index of a temporally hierarchical layer with which the frame 142'a to 142'e or the spatial or chromatic subset of said frame is associated.

In other words, the decoder 241 may generally be configured to enable a QP-based or DQP-based coding, and in particular a local QP-based or DQP-based coding, and to decode a QP or DQP information from the data stream 140', and to dequantize the frame 142'a, 142'b, 142'c or the spatial or chromatic subset of the frame using a quantization based on the QP or DQP information. For example, the decoder 241 may decode from the data stream 140' a local QP or DQP information and apply said local QP or DQP information for decoding the frames 142'a, 142'b, 142'c which are associated with the first temporally hierarchical layer. Accordingly, said frames 142'a, 142'b, 142'c or the spatial or chromatic subset of said frames may be subjected to local QP adaptation.

Additionally or alternatively, for example if the flag 165 is set, the decoder 241 may be configured to disable QP-based or DQP-based coding, and in particular a local QP-based or DQP-based coding, and to omit decoding a QP or DQP information from the data stream 140', for certain one or more frames 142'd, 142'e (e.g. for frames 142'd, 142'e being associated with the second temporally hierarchical layer) and to dequantize these one or more frames 142'd, 142'e or spatial or chromatic subset of these one or more frames 142'd, 142'e using a predetermined quantization, for example a global QP. For example, the decoder 241 may not decode any local QP or DQP information from the data stream 140' for the frames 142'd, 142'e being associated with the predetermined, e.g. second, temporally hierarchical layer. Accordingly, these frames 142'd, 142'e or the spatial or chromatic subset of these frames may not be subjected to a local QP adaptation.

In result, the decoder 241 may create a reconstructed video stream 140" comprising the reconstructed GOP 143" comprising the reconstructed frames 142"a to 142"e which have been decoded in a manner as described above, wherein the used coding scheme may be based on the flag 165, i.e. based on the index of the temporally hierarchical layer with which the respective frame is associated.

In other words, at the decoder 241, the same 1-bit flag 165 useSelectiveDQP may be read and entropy-decoded from the received bitstream 140', and its value may control whether the inventive principle is applied (1) or not (0).

During decoding, in frames 142'd, 142'e (or, alternatively, slices or chromatic subsets like color channels or planes) where DQP coding is not used (as indicated by the frame/slice index, which is known to the decoder 241), no DQP values are read and consequently, no DQP values are decoded from the bitstream 140', and subsequent algorithmic operations assume each DQP value to be zero (i.e., actual QP value=predicted QP value).

As in the encoder 141, known technology transmits a sliceQP value for each frame/slice regardless of whether DQP coding is actually allowed. Thus, when DQP coding is allowed, the predicted QP value associated with the first QP value of a frame/slice is based on said sliceQP value. In this way, the encoder 141 and decoder 241 can operate in a fully synchronized fashion while, at the same time, the bitstream size is reduced by not having to transmit some zero-valued DQPs.

Summarizing in more general terms, the decoder 241 may use a first granularity of applying a QP to frames 142'$a$, 142'$b$, 142'$c$ being associated with a first temporally hierarchical layer, and the decoder 241 may use a second granularity of applying a QP to frames 142'$d$, 142'$e$ being associated with a second temporally hierarchical layer. Accordingly, the decoder 241 may vary the granularity at which a QP may be applied to certain frames (or subsets of frames). For example, for the frames 142'$a$, 142'$b$, 142'$c$ being associated with the first temporally hierarchical layer, a global and a local QP information may be available. Thus, these frames 142'$a$, 142'$b$, 142'$c$ may be subjected to a local QP adaptation during coding. For the frames 142'$d$, 142'$e$ being associated with a second temporally hierarchical layer, no local QP information may be available. Thus, these frames 142'$d$, 142'$e$ may not be subjected to a local QP adaptation during coding.

The above examples may have been described with reference to QP-based coding schemes. However, also a DQP-based coding scheme may be used. That is, both during encoding and during decoding, the local QP may be coded differentially. Thus, the encoder 141 and the decoder 241 may use a DQP-based coding scheme and they may encode or decode, respectively, a local DQP information into or from the data stream 140'. As noted above, such DQP-based coding may involve a prediction of the QP value, wherein the predicted QP value is subtracted from the actual QP value so as to obtain a differential QP (DQP) value for coding at the encoder side, and wherein the same predicted QP value is added again to the DQP value during decoding at the decoder side so as to reconstruct the actual QP value in a non-differential representation (for use during image decoding). The QP predictor may be a spatial predictor or a chromatic (cross-component) predictor.

Figure 9:
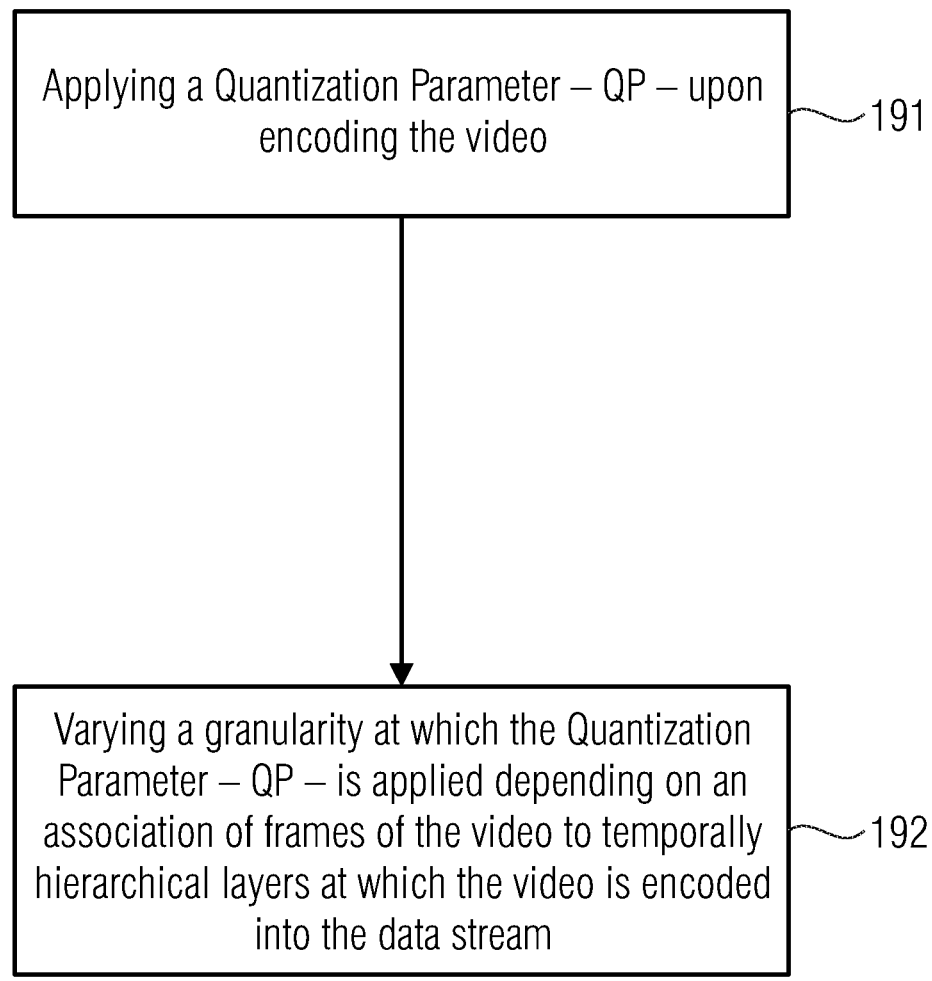
FIG. 9 shows a schematic block diagram of a method of encoding a video into a data stream according to an embodiment.

FIG. 9 shows a schematic block diagram of a method for encoding a video stream according to an embodiment.

In block 191 a Quantization Parameter—QP—is applied upon encoding the video.

In block 192 a granularity is varied at which the Quantization Parameter—QP—is applied depending on an association of frames 142'$a$ to 142'$e$ of the video to temporally hierarchical layers at which the video is encoded into the data stream 140'.

Figure 10:
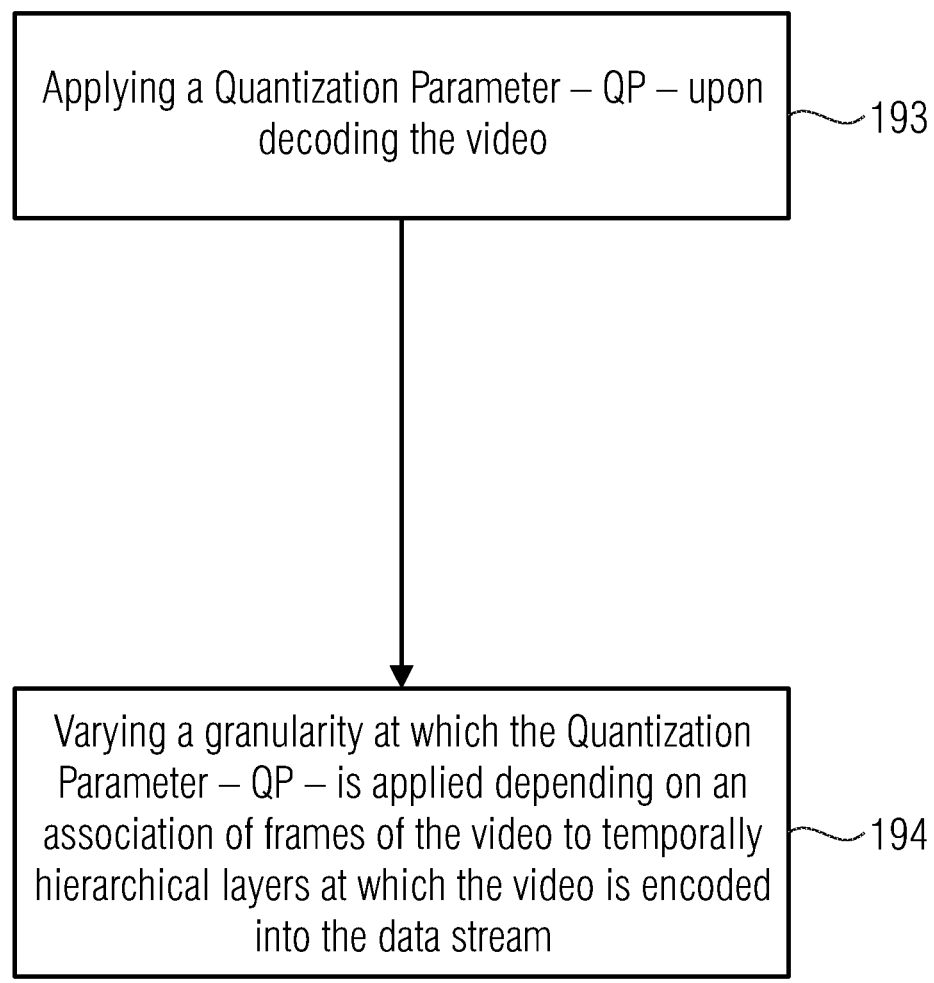
FIG. 10 shows a schematic block diagram of a method of decoding a video from a data stream according to an embodiment.

FIG. 10 shows a schematic block diagram of a method for decoding a video stream according to an embodiment.

In block 193 a Quantization Parameter—QP—is applied upon decoding the video.

In block 194 a granularity is varied at which the Quantization Parameter—QP—is applied depending on an association of frames 142'$a$ to 142'$e$ of the video to temporally hierarchical layers at which the video is encoded into the data stream 140'.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

SOURCES

[1] ITU-T, Recommendation H.265 and ISO/IEC, Int. Standard 23008-2, "High efficiency video coding," Geneva, Switzerland, January 2017, online: http://www.itu.int/rec/T-REC-H.265

[2] EP17192477, "Method for varying a coding quantization parameter across a picture," 2017.

[3] V. Sze, M. Budagavi, and G. J. Sullivan, *High Efficiency Video Coding (HEVC)—Algorithms and Architectures*, Cham, Switzerland: Springer International Publishing, 2014.

The invention claimed is:

1. A video encoder for encoding a video into a data stream, wherein the video encoder is configured to vary a granularity at which a Quantization Parameter (QP) is applied depending on an association of frames of the video to temporally hierarchical layers at which the video is encoded into the data stream in spatial terms so that the granularity at which the Quantization Parameter varies in the frames depends on the association of the frames of the video to the temporally hierarchical layers.

2. The video encoder of claim 1, wherein the video encoder is configured to use a temporally hierarchical coding scheme, wherein at least one frame or a spatial or chromatic subset of the at least one frame is associated with a first temporally hierarchical layer, and wherein at least one further frame or a spatial or chromatic subset of the at least one further frame is associated with a second temporally hierarchical layer.

3. The video encoder of claim 1, wherein the video encoder is configured to omit encoding QP information into the data stream for one or more frames or spatial or chromatic subsets of the one or more frames, which are associated with a predetermined temporally hierarchical layer, during coding.

4. The video encoder of claim 1, wherein the video encoder is configured to use a Differential Quantization Parameter (DQP)-based coding scheme, and wherein the video encoder is configured to disable DQP-based coding and to omit encoding DQP information into the data stream for one or more frames or a spatial or chromatic subset of the one or more frames, which are associated with a predetermined temporally hierarchical layer, during coding.

5. The video encoder of claim 1, wherein the video encoder is configured to use a Differential Quantization Parameter (DQP)-based coding scheme, and wherein the video encoder is configured to encode DQP information into the data stream for the frames at the granularity at which the Quantization Parameter varies in the frames.

6. The video encoder of claim 1, wherein the frames of the video comprise spatial subsets and the video encoder is configured to use a Differential Quantization Parameter (DQP)-based coding scheme, and encode DQP information into the data stream for a predetermined spatial subset within first frames, which are associated with a first temporally hierarchical layer, and omit encoding the DQP information into the data stream for the predetermined spatial subset within second frames, which are associated with a second temporally hierarchical layer.

7. A video encoder for encoding a video into a data stream, wherein the video encoder is configured to vary a granularity at which a Quantization Parameter (QP) is applied depending on an association of frames of the video to temporally hierarchical layers at which the video is encoded into the data stream, wherein the video encoder is configured to use a Differential Quantization Parameter (DQP)-based coding scheme, wherein the video encoder is configured to disable DQP-based coding and to omit encoding DQP information into the data stream for one or more frames or a spatial or chromatic subset of the one or more frames, which are associated with a predetermined temporally hierarchical layer, during coding, and wherein the video encoder is configured to omit encoding the DQP information into the data stream for one or more frames or a spatial or chromatic subset of the one or more frames, which are associated with a highest temporally hierarchical layer.

8. A video encoder for encoding a video into a data stream, wherein the video encoder is configured to vary a granularity at which a Quantization Parameter (QP) is applied depending on an association of frames of the video to temporally hierarchical layers at which the video is encoded into the data stream, wherein the video encoder is configured to use a Differential Quantization Parameter (DQP)-based coding scheme, wherein the video encoder is configured to disable DQP-based coding and to omit encoding DQP information into the data stream for one or more frames or a spatial or chromatic subset of the one or more frames, which are associated with a predetermined temporally hierarchical layer, during coding, and wherein the video encoder is configured to
  determine an index of a temporally hierarchical layer with which a frame or a spatial or chromatic subset of the frame is associated, and compare the index with a predetermined index threshold value, wherein
    if the index is equal to or lower than the index threshold value, the video encoder is configured to enable the DQP-based coding scheme and to encode the DQP information into the data stream for those frames being associated with the temporally hierarchical layer comprising an index being equal to or lower than the index threshold value, or
    if the index is larger than the index threshold value, the video encoder is configured to disable the DQP-based coding and to omit encoding the DQP information into the data stream, and to set a flag in the data stream indicating that the data stream does not comprise the DQP information for those frames being associated with the temporally hierarchical layer comprising an index being larger than the index threshold value.

9. The video encoder of claim 8, wherein the video encoder is configured to use a Random Access (RA) coding scheme, and wherein the video encoder is configured to reorder the frames and to omit encoding the DQP information into the data stream for one or more frames or a spatial or chromatic subset of the one or more frames, which comprise an odd picture order count (POC) and/or which are associated with a temporally hierarchical layer comprising an index above the predetermined index threshold value.

10. The video encoder of claim 8, wherein the video encoder is configured to entropy-encode the flag and to transmit the flag at a start of the data stream, or to transmit the flag at a start of a random access point of the data stream in case a random access coding scheme is used.

11. A video decoder for decoding a video from a data stream, wherein the video decoder is configured to vary a granularity at which a Quantization Parameter (OP) is applied depending on an association of frames of the video to temporally hierarchical layers in spatial terms so that the granularity at which the Quantization Parameter varies in the frames depends on the association of the frames of the video to the temporally hierarchical layers.

12. The video decoder of claim 11, wherein the video decoder is configured to use a temporally hierarchical coding scheme, wherein at least one frame or a spatial or chromatic subset of the at least one frame is associated with a first temporally hierarchical layer, and wherein at least one further frame or a spatial or chromatic subset of the at least one further frame is associated with a second temporally hierarchical layer.

13. The video decoder of claim 11, wherein the video decoder is configured to omit decoding QP information from the data stream for one or more frames or spatial or chromatic subsets of the one or more frames, which are associated with a predetermined temporally hierarchical layer, during decoding.

14. The video decoder of claim 11, wherein the video decoder is configured to use a Differential Quantization Parameter (DQP)-based coding scheme, and wherein the decoder is configured to disable DQP-based coding and omit decoding DQP information from the data stream for one or more frames or a spatial or chromatic subset of the one or more frames, which are associated with a predetermined temporally hierarchical layer, during decoding.

15. The video decoder of claim 11, wherein the video decoder is configured to use a DQP-based coding scheme, and wherein the video decoder is configured to disable DQP-based coding and omit decoding DQP information from the data stream for one or more frames or a spatial or chromatic subset of the one or more frames, which are associated with a highest temporally hierarchical layer, during decoding.

16. The video decoder of claim 11, wherein the video decoder is configured to use a Differential Quantization Parameter (DQP)-based coding scheme, and wherein the video decoder is configured to decode DQP information from the data stream for the frames at the granularity at which the Quantization Parameter varies in the frames.

17. The video decoder of claim 11, wherein the frames of the video comprise spatial subsets and the video decoder is configured to use a Differential Quantization Parameter (DQP)-based coding scheme, and decode DQP information from the data stream for a predetermined spatial subset within first frames, which are associated with a first temporally hierarchical layer, and omit decoding the DQP information from the data stream for the predetermined spatial subset within second frames, which are associated with a second temporally hierarchical layer.

18. A video decoder for decoding a video from a data stream, wherein the video decoder is configured to vary a granularity at which a Quantization Parameter (QP) is applied depending on an association of frames of the video to temporally hierarchical layers, wherein the video decoder is configured to use a DQP-based coding scheme, and wherein the video decoder is configured to disable DQP-based coding and omit decoding DQP information from the data stream for one or more frames or a spatial or chromatic subset of the one or more frames, which comprise an odd picture order count (POC) and/or which are associated with a predetermined temporally hierarchical layer.

19. A video decoder for decoding a video from a data stream, wherein the video decoder is configured to vary a granularity at which a Quantization Parameter (QP) is applied depending on an association of frames of the video to temporally hierarchical layers, wherein the video decoder is configured to use a Differential Quantization Parameter (DQP)-based coding scheme, wherein the decoder is configured to disable DQP-based coding and omit decoding DQP information from the data stream for one or more frames or a spatial or chromatic subset of the one or more frames, which are associated with a predetermined temporally hierarchical layer, during decoding, and wherein the video decoder is configured to
  derive a flag from the data stream, wherein the flag indicates how to decode a frame or a spatial or chromatic subset of the frame based on an index of a temporally hierarchical layer with which the frame or the spatial or chromatic subset of the frame is associated, wherein
  if the flag is set, the decoder is configured to disable the DQP-based coding and to omit decoding the DQP information from the data stream, and to dequantize the frame or spatial or chromatic subset of the frame using a predetermined quantization.

20. The video decoder of claim 19, wherein the video decoder is configured to entropy-decode the flag and to derive the flag from a start of the data stream, or to derive the flag from a start of a random access point of the data stream in case a random access coding scheme is used.

21. A method for encoding a video into a data stream, the method comprising:
  applying a Quantization Parameter (QP) upon encoding the video, and
  varying a granularity at which the Quantization Parameter (QP) is applied depending on an association of frames of the video to temporally hierarchical layers at which the video is encoded into the data stream in spatial terms so that the granularity at which the Quantization Parameter varies in the frames depends on the association of the frames of the video to the temporally hierarchical layers.

22. A method for decoding a video from a data stream, the method comprising:
  applying a Quantization Parameter (QP) upon decoding the video, and
  varying a granularity at which the Quantization Parameter (QP) is applied depending on an association of frames of the video to temporally hierarchical layers in spatial terms so that the granularity at which the Quantization Parameter varies in the frames depends on the association of the frames of the video to the temporally hierarchical layers.

23. A non-transitory digital storage medium having a computer program stored thereon to perform a method for encoding a video into a data stream, the method comprising:
  applying a Quantization Parameter (QP) upon encoding the video, and
  varying a granularity at which the Quantization Parameter (QP) is applied depending on an association of frames of the video to temporally hierarchical layers at which the video is encoded into the data stream in spatial terms so that the granularity at which the Quantization Parameter varies in the frames depends on the association of the frames of the video to the temporally hierarchical layers, when the computer program is run by a computer.

24. A non-transitory digital storage medium having a computer program stored thereon to perform a method for decoding a video from a data stream, the method comprising:

applying a Quantization Parameter (QP) upon decoding the video, and varying a granularity at which the Quantization Parameter (QP) is applied depending on an association of frames of the video to temporally hierarchical layers in spatial terms so that the granularity at which the Quantization Parameter varies in the frames depends on the association of the frames of the video to the temporally hierarchical layers, when the computer program is run by a computer.

* * * * *